United States Patent [19]
Kobayashi et al.

[11] Patent Number: 4,713,766
[45] Date of Patent: Dec. 15, 1987

[54] METHOD AND APPARATUS FOR CONTROLLING AIR-FUEL RATIO IN INTERNAL COMBUSTION ENGINE

[75] Inventors: Nobuyuki Kobayashi; Takashi Hattori, both of Toyota; Katsunori Yagi, Toyoake; Toshimitsu Ito, Toyota, all of Japan

[73] Assignee: Toyota Jidosha Kabushiki Kaisha, Toyota, Japan

[21] Appl. No.: 730,581

[22] Filed: May 6, 1985

[30] Foreign Application Priority Data

May 7, 1984 [JP] Japan .................................. 59-089242

[51] Int. Cl.⁴ ................................................ F02D 5/02
[52] U.S. Cl. ............................... 364/431.05; 123/480; 123/478; 123/416
[58] Field of Search .............. 364/431.05; 123/188 M, 123/478, 416

[56] References Cited

U.S. PATENT DOCUMENTS

| 4,377,996 | 3/1983 | Yamaguchi | 123/416 |
| 4,424,568 | 1/1984 | Nishimura et al. | 364/431.05 |
| 4,538,578 | 9/1985 | Suzuki et al. | 123/478 |
| 4,562,817 | 1/1986 | Ito | 123/478 |
| 4,587,938 | 5/1986 | Kobayashi et al. | 123/480 |

Primary Examiner—Parshotam S. Lall
Attorney, Agent, or Firm—Cushman, Darby & Cushman

[57] ABSTRACT

In an internal combustion engine having a throttle valve, a flag or switch having hysteresis characteristics using the operation of the throttle valve is provided.

12 Claims, 22 Drawing Figures

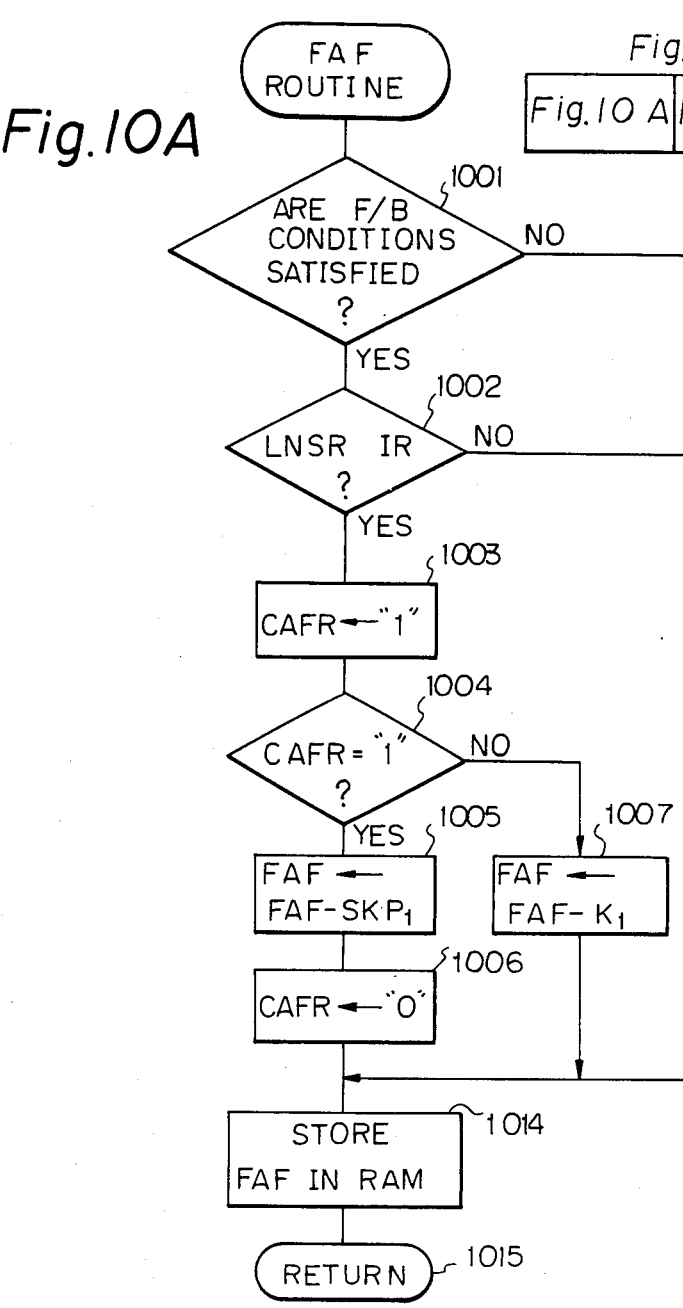

METHOD AND APPARATUS FOR CONTROLLING AIR-FUEL RATIO IN INTERNAL COMBUSTION ENGINE

BACKGROUND OF THE INVENTION (1) Field of the Invention

The present invention relates to a method and apparatus for feedback control of the air-fuel ratio in an internal combustion engine.

(2) Description of the Related Art

As measures taken against exhaust gas pollution and fuel consumption, a lean burn system has recently been developed. According to this lean burn system, a lean mixture sensor is provided for generating an analog current proportional to the lean air-fuel mixture in an exhaust pipe of an engine. Feedback control of the air-fuel ratio of the engine is possible using the analog output of the lean mixture sensor, thereby attaining an arbitrary air-fuel ratio on the lean side.

Additionally, a switch may be provided at a throttle valve within an intake air passage of the engine to detect the opening of the throttle valve. With this additional switch, the aimed air-fuel ratio is calculated in response to the on- and off-states of the switch. Feedback control of the air-fuel ratio of the engine is carried out so that the controlled air-fuel ratio is brought close to the aimed air-fuel ratio. When the switch is on, feedback control of the air-fuel ratio is stopped. Instead, the air-fuel ratio of the engine is controlled to be a power fuel increment air-fuel ratio, for example, about 12 to 13. A valve, such as a swirl control valve (SCV) may also be controlled in response to the on- and off-states of the switch.

During steady engine operation where the throttle valve is near the opening position detected by the switch, however, repeated on- and off-operation of the switch can result in fluctuation of the engine air-fuel ratio, thus causing surging. Also, an SCV is controlled by negative pressure having hysteresis characteristics. When an SCV is controlled by such a switch, it remains in an open state for a period of time even after the switch is changed from the on-state to the off-state. In this time period, the air-fuel ratio of the engine is erroneously controlled to be on the lean side, inviting misfiring or surging.

SUMMARY OF THE INVENTION

It is an object of the present invention to provide a method and apparatus for controlling the air-fuel ratio in an internal combustion engine with reduced fluctuation of the controlled air-fuel ratio and no unstable SCV or other valve operation.

According to the present invention, in an internal combustion engine having a throttle valve, a flag or switch having hysteresis characteristics by using the operation of the throttle valve is provided. The air-fuel ratio of the engine or the SCV is controlled in accordance with the flag or switch having the hysteresis characteristics.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENT

Figure 1:
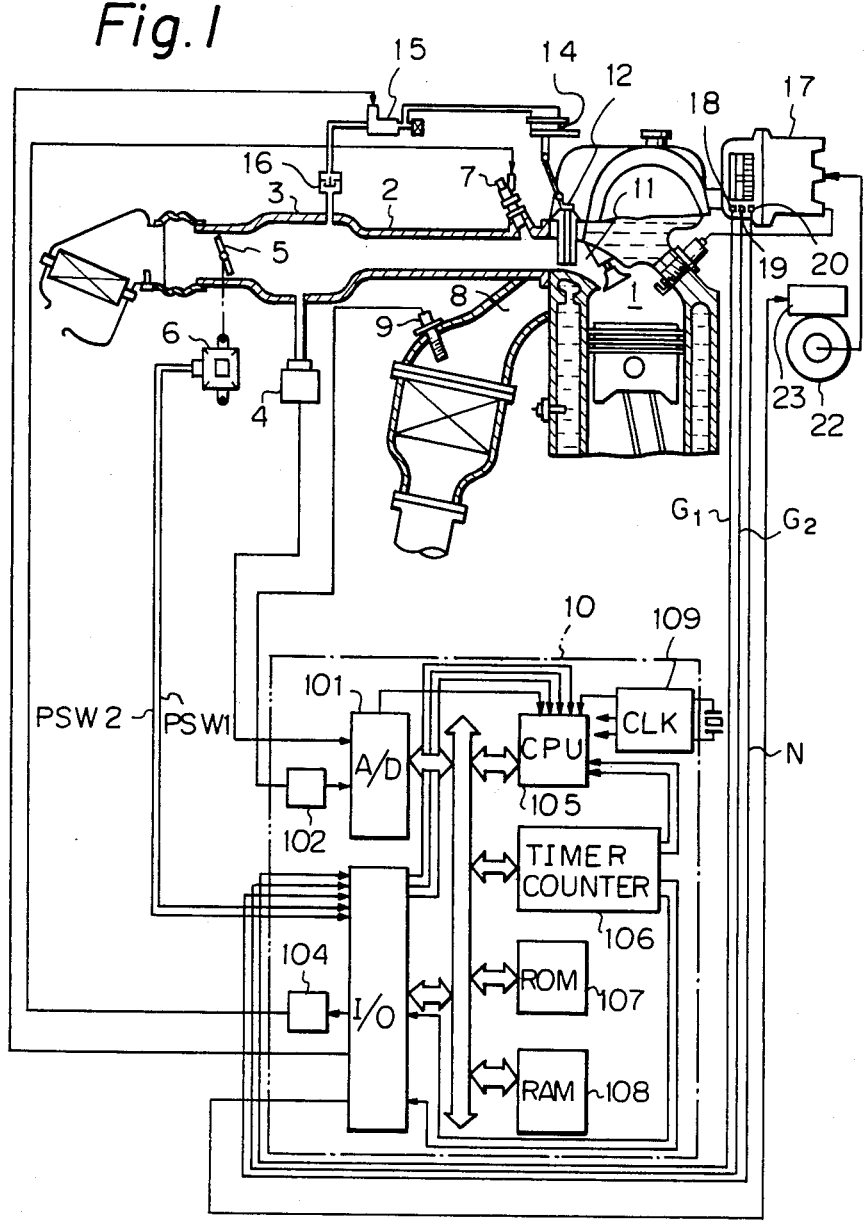
FIG. 1 is a schematic diagram of an internal combustion engine according to the present invention.

In FIG. 1, which illustrates an internal combustion engine according to the present invention, reference numeral 1 designates a four-cycle spark ignition engine disposed in an automotive vehicle. Provided in an air-intake passage 2 of the engine 1 is a surge tank 3 in which a pressure sensor 4 is provided. The pressure sensor 4 is used for detecting the absolute pressure within the intake-air passage 2 and transmits its output signal to a multiplexer-incorporating analog-to-digital (A/D) converter 101 of a control circuit 10.

Provided in a throttle valve 5 of the intake air passage 2 is a throttle sensor 6 which incorporates two switches. One of the switches is turned on when the opening TA of the throttle valve 5 is larger than a relatively small definite value such as 25°, while the other is turned on when the opening TA of the throttle valve 5 is larger than a relatively large definite value such as 50°. The outputs of the throttle sensor 6 are supplied to an input/output (I/O) interface 103 of the control circuit 10.

Additionally provided in the air-intake passage 2 is a fuel injector 7 for supplying pressurized fuel from the fuel system (not shown) to the air-intake port of the cylinder of the engine 1. In this case, other fuel injectors are also provided for other cylinders, though not shown in FIG. 1.

Figure 2:
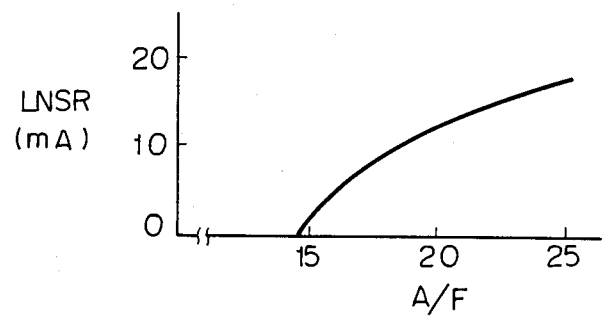
FIG. 2 is a graph showing the output characteristics of the lean mixture sensor of FIG. 1.

Provided in an exhaust gas passage 8 of the engine 1 is a lean mixture sensor 9 for detecting the concentration of oxygen composition in the exhaust gas. The lean mixture sensor 9 generates a limit current signal LNSR as shown in FIG. 2 and transmits it via a current-to-voltage converter circuit 102 of the control circuit 10 to the A/D converter 101 thereof.

Figure 3:
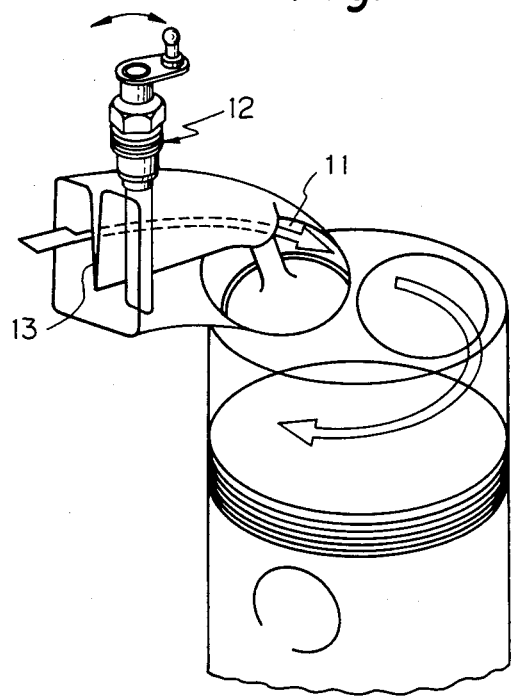
FIG. 3 is a partial, enlarged diagram of the SCV of FIG. 1.

Provided in an intake air port 11 is an SCV 12. In more detail, as illustrated in FIG. 3, the intake air port 11 is divided into two passages by the separator 13, and the above-mentioned SCV 12 is provided in one of the passages. When the SCV 12 is opened, a usual intake air operation is carried out. When the SCV 12 is closed, a strong swirl as indicated by the arrow is generated. For example, when the engine speed is high or the opening TA of the throttle valve 5 is larger than 50°, the SCV 12 is opened to obtain an power fuel increment air-fuel ratio. On the other hand, when the engine speed is low and the opening TA of the throttle valve 5 is smaller than 50°, the SCV 12 is closed to generate a strong swirl, thereby improving engine combustion.

Figure 4:
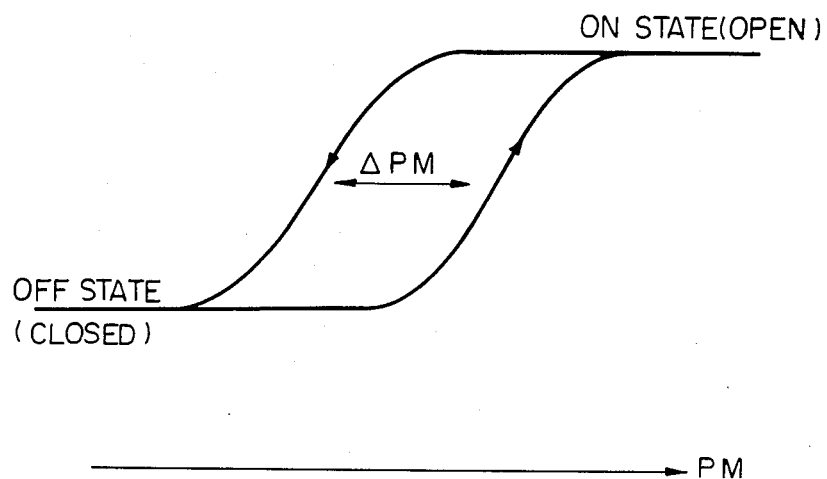
FIG. 4 is a graph showing the characteristics of the SCV of FIG. 1.

The SCV 12 is connected via a diaphragm actuator 14, a negative pressure switch valve 15, and a check valve 16 to the surge tank 3 of the intake air passage 2. As a result, when the negative pressure switch valve 15 is turned on and the intake air pressure PM of the intake air passage 2 is low, the SCV 12 is closed. On the other hand, when the negative pressure switch valve 15 is turned off and the intake air pressure PM is high, the SCV 12 is closed. Since the on(open) and off(closed) states of the SCV 12 are due to the mechanical structure of the diaphragm actuator 14, the on- and off-operation of the SCV 12 has the hysteresis characteristics as shown in FIG. 4.

Disposed in a distributor 7 are crank angle sensors 18, 19, and 20 for detecting the angle of the crankshaft (not shown) of the engine 1. In this case, the crank-angle sensors 18 and 19 generate pulse signals $G_1$, $G_2$ at every 720° crank angle (CA) while the crank-angle sensor 20 generates a pulse signal N at every 30° CA. In this case, the signals $G_1$ and $G_2$ are shifted in phase 360° CA from each other. The pulse signals $G_1$, $G_2$, and N of the crank angle sensors 18, 19, and 20 are supplied to the I/O interface 103 of the control circuit 10 and are then supplied to interruption terminals of a central processing unit (CPU) 105.

Provided for each cylinder is a spark plug 21 connected via the distributor 17 to an ignition coil 22 which is driven by an igniter 23. The igniter 23 is connected to the I/O interface 103 of the control circuit 10. That is, current is supplied to the igniter 23 at a current supply start timing such as at 30° CA before a current supply end timing, thus turning on the igniter 23. Then, at a current supply end timing, i.e., at an ignition timing, the igniter 23 is turned off. Thus ignition of one cylinder of the engine is performed.

The control circuit 10, which may be constructed by a microcomputer, includes a driver circuit 104 for driving the fuel injector 11, a timer counter 106, a read-only memory (ROM) 107 for storing a main routine, interrupt routines such as a fuel injection routine, an ignition timing routine, tables (maps), constants, etc., a random-access memory 108 (RAM) for storing temporary data, a clock generator 109 for generating various clock signals, and the like, in addition to the A/D converter 101, the current-to-voltage converter circuit 102, the I/O interface 103, and the CPU 105.

The timer counter 106 may include a free-run counter, a first compare register, a first comparator for comparing the content of the free-run counter with that of the first compare register, flag registers for a first compare interruption, injection control, and the like, thus controlling the injection start and end operation. Further, the timer counter 106 may include a second compare register, a second comparator for comparing the content of the free-run counter with that of the second compare register, flag registers for a second compare interruption ignition control, and the like, thus controlling the current supply start and end operation for ignition.

Interruptions occur at the CPU 105, when the A/D converter 101 completes an A/D conversion and generates an interrupt signal; when one of the crank angle sensors 18, 19, 20 generates a pulse signal; when the timer counter 106 generates a compare interrupt signal; and when the clock generator 109 generates a special clock signal.

The pressure data PM of the pressure sensor 4 and the limit current data LNSR of the lean mixture sensor 9 are fetched by an A/D conversion routine executed at every predetermined time period and are then stored in the RAM 108. That is, the data PM and LNSR in the RAM 108 are renewed at every predetermined time period. The engine speed Ne is calculated by an interrupt routine executed at 30° CA, i.e., at every pulse signal N of the crank angle sensor 20, and is then stored in the RAM 108.

Figure 5A:
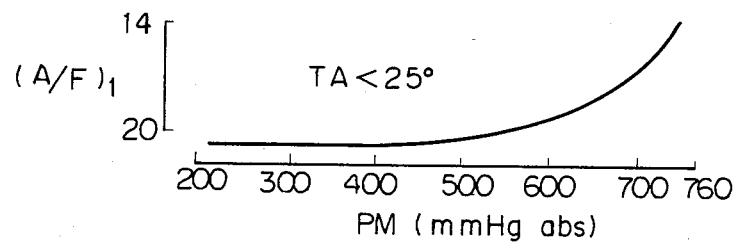
Figure 5B:
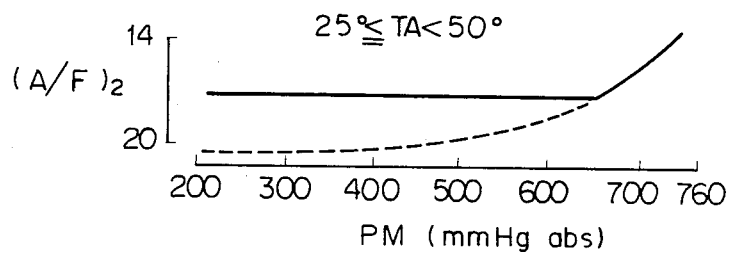
Figure 5C:
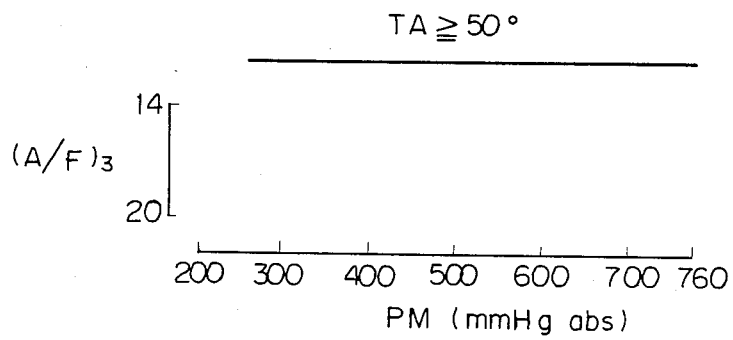

FIGS. 5A, 5B, and 5C are graphs of the base air-fuel ratio used in the present invention. When the opening TA of the throttle valve 5 is smaller than 25°, feedback of the air-fuel ratio of the engine is carried out so that the air-fuel ratio is brought close to a base air-fuel ratio $(A/F)_1$ calculated in accordance with the intake air pressure data PM as shown in FIG. 5A. However, in FIG. 5A, it is actually impossible to realize PM=760 mmHg abs when TA<25°. Also, when the opening TA of the throttle valve 5 is equal to or larger than 25° and is smaller than 50°, feedback of the air-fuel ratio of the engine is carried out so that the air-fuel ratio is brought close to a base air-fuel ratio $(A/F)_2$ calculated in accordance with the intake air pressure data PM as shown in FIG. 5B. In this case, the base air-fuel ratio $(A/F)_2$ is on the rich side as compared with the base air-fuel ratio $(A/F)_1$ by applying a limit on the lean side to the base air-fuel ratio $(A/F)_1$, in order to reduce the torque fluctuation in driving at a low altitude location. Further, when the opening TA of the throttle valve 5 is equal to or larger than 50°, feedback control of the air-fuel ratio of the engine is stopped, and a power fuel increment corresponding to the base air-fuel ratio $(A/F)_3$ (=about 12 to 13) as shown in FIG. 5C is calculated.

Figure 6:
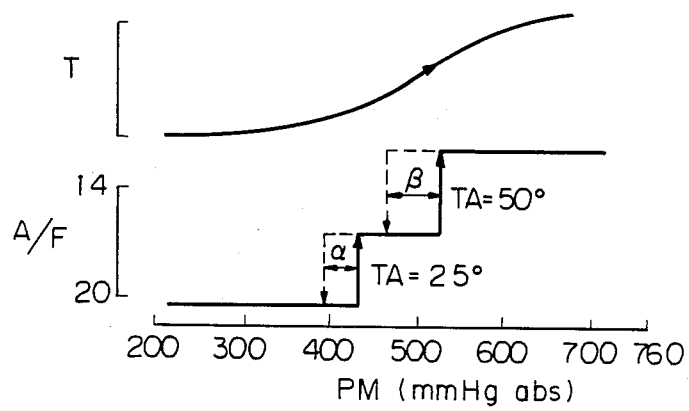
FIGS. 5A, 5B, 5C and 6, are graphs showing the characteristics of the base air-fuel ratio used in the present invention.

When the engine is controlled in accordance with the air-fuel ratio as shown in FIGS. 5A, 5B, and 5C, depending upon the opening of the throttle valve 5, the actual air-fuel ratio A/F and torque T are controlled as indicated by solid lines in FIG. 6. When the opening TA of the throttle valve 5 is near 25° or 50°, chattering occurs. Further, assume that the SCV 12 is controlled at TA=50°. In this case, even if TA<50° is satisfied, the SCV 12 still remains in an open state due to the hysteresis characteristics of the diaphragm actuator 14. Nevertheless, it is considered that the SCV 12 is in a closed state, so that the air-fuel ratio of the engine is controlled to be on the lean side. As a result, misfires or surging are generated. In the present invention, the air-fuel ratio has the hysteresis characteristics indicate by the dotted lines in FIG. 6, thereby avoiding hunting. Further, the hysteresis width $\beta$ at TA=50° in which the SCV 12 is controlled is larger than the change width $\Delta$PM from the on-state to the off-state as shown in the hysteresis characteristics of the SCV 12 of FIG. 4, thereby avoiding surging.

Figure 7:
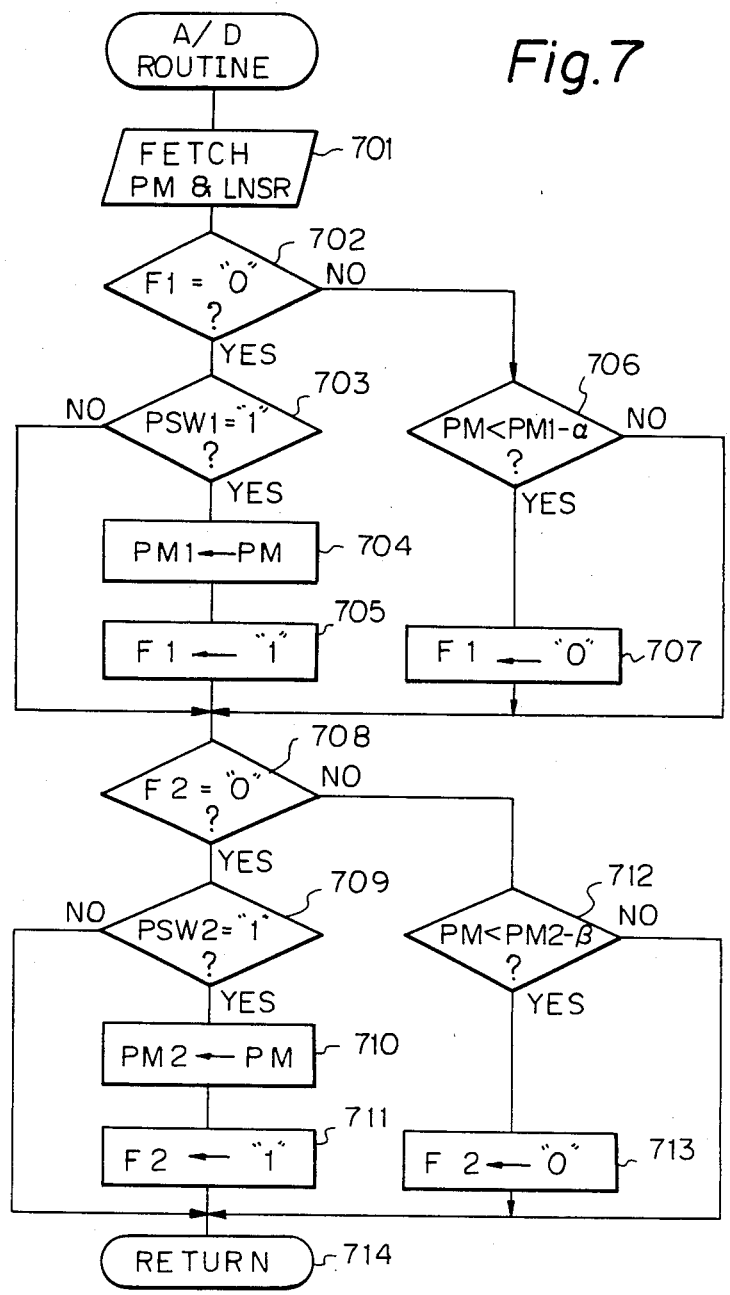
FIGS. 7, 9 10A, 10B, 11, 12, 13, 14, 15, 16, 17, 18 and 19 are flow charts showing the operation of the control circuit of FIG. 1.

FIG. 7 is an A/D conversion routine executed at every predetermined time period. Note that PSW1 is an output of the first switch, incorporated in the throttle sensor 6, which is turned on when the opening TA of the throttle valve 5 is equal to or larger than 25° (TA≧25°). PSW2 is an output of the second switch, incorporated in the throttle sensor 6, which is turned on when the opening TA of the throttle valve 5 is equal to or larger than 50° (TA≧50°).

At step 701, the intake air pressure PM is fetched from the pressure sensor 4 via the A/D converter 101 and is then stored in the RAM 108. Also the limit current LNSR of the lean mixture sensor 9 is fetched via the A/D converter 101 and is then stored in the RAM 108.

The steps 702 to 706 are explained with reference to FIG. 8A.

At step 702, it is determined whether or not a flag F1 is "0". Note that the flag F1 is cleared as an initial stage.

Then, the control proceeds to step 703, where it is determined whether or not the output PSW1 of the first switch satisfies PSW1="1". If TA<25°, so that PSW1="0", then the control proceeds directly to step 708.

When the opening TA of the throttle valve 5 reaches 25°, the control at step 703 proceeds to step 704, in which

PM1←PM.

That is, the value PM1 is the intake air pressure PM when the first which of the throttle sensor 6 is turned on. Then, at step 705, the flag F1 is set (F1="1").

Next, when the routine of FIG. 7 is again carried out, the control at step 702 proceeds to step 706, which determines whether or not PM<PM1−α is satisfied. Note that α is a definite value, such as 50 mmHg abs. If PM≧PM1−α, the control proceeds directly to step 708, so that the flag F1 is unchanged. If PM<PM1−α, the control proceeds to step 707, which resets the flag F1.

Thus, the flag F1 is caused to be "1" simultaneously with the turning on of the first switch of the throttle valve 5, and the flag F1 is caused to be "0" when the intake air pressure PM reaches PM1−α. That is, the flag F1 operates as a switch having hysteresis characteristics. In the present invention, the air-fuel ratio is controlled by the flag F1 as the switch having hysteresis characteristics instead of the first switch of the mechanical throttle sensor 6 having no hysteresis characteristics.

The steps 708 to 713 are explained with reference to FIG. 8B.

At step 708, it is determined whether or not a flag F2 is "0". Note that the flag F2 is cleared as an initial stage. Then, the control proceeds to step 709, where it is determined whether or not the output PSW2 of the second switch of the throttle sensor 6 satisfies PSW2="1". If TA<50°, so that PSW2="0", then the control proceeds directly to step 714.

When the opening TA of the throttle valve 5 reaches 50°, the control at step 709 proceeds to step 710, in which

PM2←PM.

That is, the value PM2 is the intake air pressure PM when the second switch of the throttle sensor 6 is turned on. Then, at step 711, the flag F2 is set (F1="1").

Next, when the routine of FIG. 7 is again carried out, the control at step 708 proceeds to step 712, which determines whether or not PM<PM2−β is satisfied. Note that α is a definite value, such as 160 mmHg abs. If PM≧PM2−β, the control proceeds directly to step 714, so that the flag F1 is unchanged. If PM<PM2−β, the control proceeds to step 713, which resets the flag F2.

Thus, the flag F2 is caused to be "1" simultaneously with the turning on of the second switch of the throttle valve 5, and the flag F2 is caused to be "0" when the intake air pressure PM reaches PM2−β. That is, the flag F2 operates as a switch having hysteresis characteristics. In the present invention, the air-fuel ratio is controlled by the flag F2 as the switch having hysteresis characteristics instead of the second switch of the mechanical throttle sensor 6 having no hysteresis characteristics. Further, the SCV 12 is controlled by the flag F2.

Figure 9:
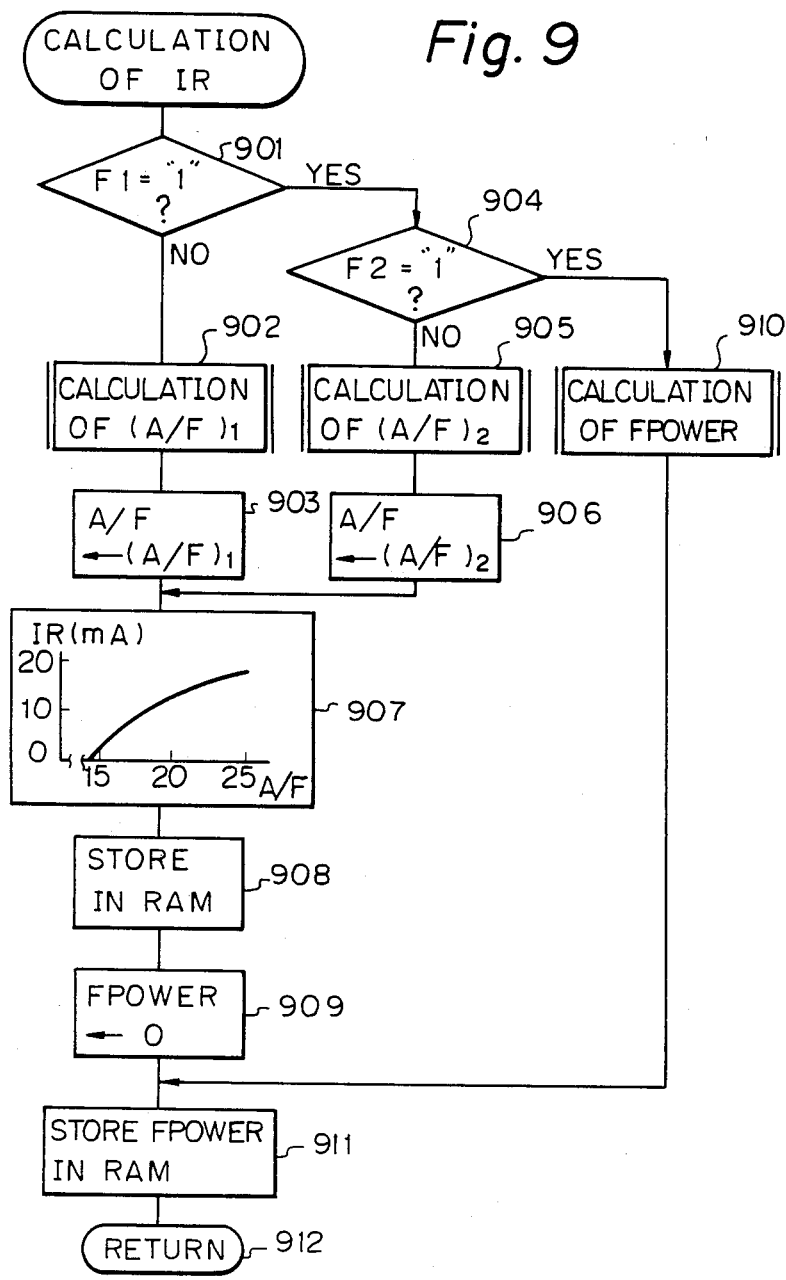

FIG. 9 is a routine for calculating a comparison reference value IR executed as one part of the main routine, or at even predetermined time period or crank angle.

At step 901, one of the outputs of the throttle sensor 6 is fetched from the I/O interface 103, and it is determined whether or not the opening TA of the throttle valve 5 satisfies TA≧25°. At step 902 the other of the outputs of the throttle sensor 6 is fetched from the I/O interface 103, and it is determined whether or not the opening TA of the throttle valve 5 satisfies TA≧50°.

Figure 8A:
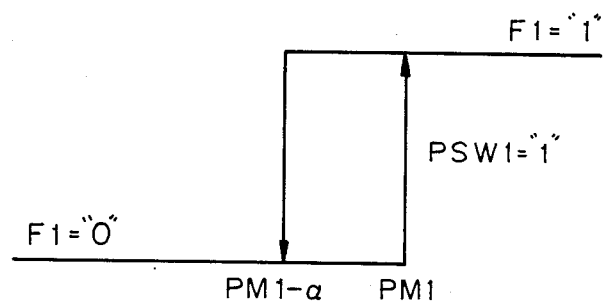
FIGS. 8A and 8B are graphs for explaining the hysteresis characteristics of the flags used in the routine of FIG. 7.
Figure 8B:
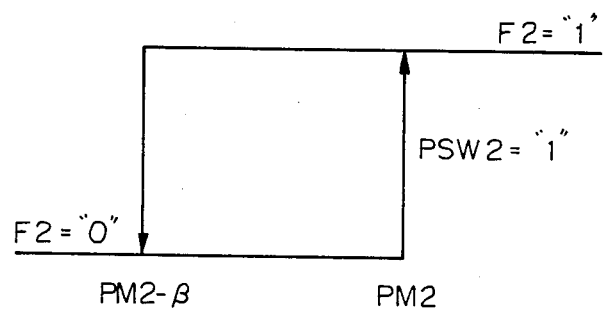

As the result, if TA<50°, the control proceeds to step 902 in which a base air-fuel ratio $(A/F)_1$ is calculated from a one-dimensional map stored in the ROM 107 by using the parameter PM as shown in FIG. 8A. Then, at step 903, A/F←$(A/F)_1$. If 25≦TA<50°, then the control proceeds to step 905 in which a base air-fuel ratio $(A/F)_2$ is calculated from a one-dimensional map stored in the ROM 107 by using the parameter PM as shown in FIG. 8B. Then, at step 906, A/F←$(A/F)_2$. Further, at step 907, a comparison reference value IR of the limit current LNSR of the lean sensor 13 is calculated from a one-dimensional map by using the parameter A/F, and then at step 908, IR is stored in the RAM 108. Further, at step 909, a power fuel increment FPOWER is cleared.

On the other hand, if TA≧50°, the control proceeds to step 910, in which a power fuel increment FPOWER is calculated from a two-dimensional map stored in the ROM 107 by using the parameters PM and Ne.

Then, at step 911, FPOWER obtained at step 909 or 910 is stored in the RAM 108. This routine is completed by step 912.

FIGS. 10A and 10B are a routine for calculating an air-fuel ratio feedback correction coefficient FAF executed at every predetermined time period.

At step 1001, it is determined whether or not all the feedback control (closed-loop control) conditions are satisfied. The feedback control conditions are as follows:

(i) the engine is not in a starting state;
(ii) the coolant temperature THW is higher than a definite value; and
(iii) the power fuel increment FPOWER is O.

Of course, other feedback control conditions are introduced as occasion demands. However, an explanation of such other feedback control conditions is omitted.

If one or more of the feedback control conditions is not satisfied, the control proceeds to step 1013, in which the coefficient FAF is caused to be 1.0 (FAF=1.0), thereby carrying out an open-loop control operation. Contrary to this, if all the feedback control conditions are satisfied, the control proceeds to step 1002.

At step 1002, the output LNSR of the lean mixture sensor 13 stored in the RAM 108 is compared with the comparison reference value IR, thereby determining whether the current air-fuel ratio is on the rich side or on the lean side with respect to the aimed air-fuel ratio. If LNSR≦IR so that the current air-fuel ratio is on the rich side, the control proceeds to step 1003, in which a lean skip flag CAFL is set, i.e., CAFL←"1". Note that the lean skip flag CAFL is used for a skip operation when a first change from the rich side to the lean side occurs in the controlled air-fuel ratio.

At step 1004, it is determined whether or not a rich skip flag CAFR is "1". Note that the skip flag CAFR is used for a skip operation when a first change from the lean side to the rich side occurs in the controlled air-fuel ratio. As a result, if the rich skip flag CAFR is "1", the control proceeds to step 1005, which decreases the coefficient FAF by a relatively large amount $SKP_1$. Then, at step 1006, the lean skip flag CAFR is cleared, i.e., CAFR←"0". Thus, when the control at step 1004 is further carried out, the control proceeds to step 1007, which decreases the coefficient FAF by a relatively small amount $K_1$. Here, $SKP_1$ is a constant for a skip operation which remarkably decreases the coefficient FAF when a first change from the lean side (LNSR>IR) to the rich side (LNSR≦IR) occurs in the controlled air-fuel ratio, while $K_1$ is a constant for an integration operation which gradually decreases the coefficient FAF when the controlled air-fuel ratio is on the rich side.

On the other hand, at step 1002, if LNSR>IR so that the current air-fuel ratio is on the lean side, the control proceeds to step 1008 in which the rich skip flag CAFR is set, i.e., CAFR←"1". Then, at step 1009, it is determined whether or not the lean skip flag CAFL is "1". As a result, if the lean skip flag CAFL is "1", the control proceeds to step 1010, which increases the coefficient FAF by a relatively large amount $SKP_2$. Then, at step 1011, the lean skip flag CAFL is cleared, i.e., CAFL←"0". Thus, when the control at step 1009 is further carried out, the control proceeds to step 1012, which increases the coefficient FAF by a relatively small amount $K_2$. Here, $SKP_2$ is a constant for a skip operation which remarkably increases the coefficient FAF when a first change from the rich side (LNSR≦IR) to the lean side (LNSR>IR) occurs in the controlled air-fuel ratio, while $K_2$ is a constant for an integration operation which gradually increases the coefficient FAF when the controlled air-fuel ratio is on the lean side.

Figure 10:
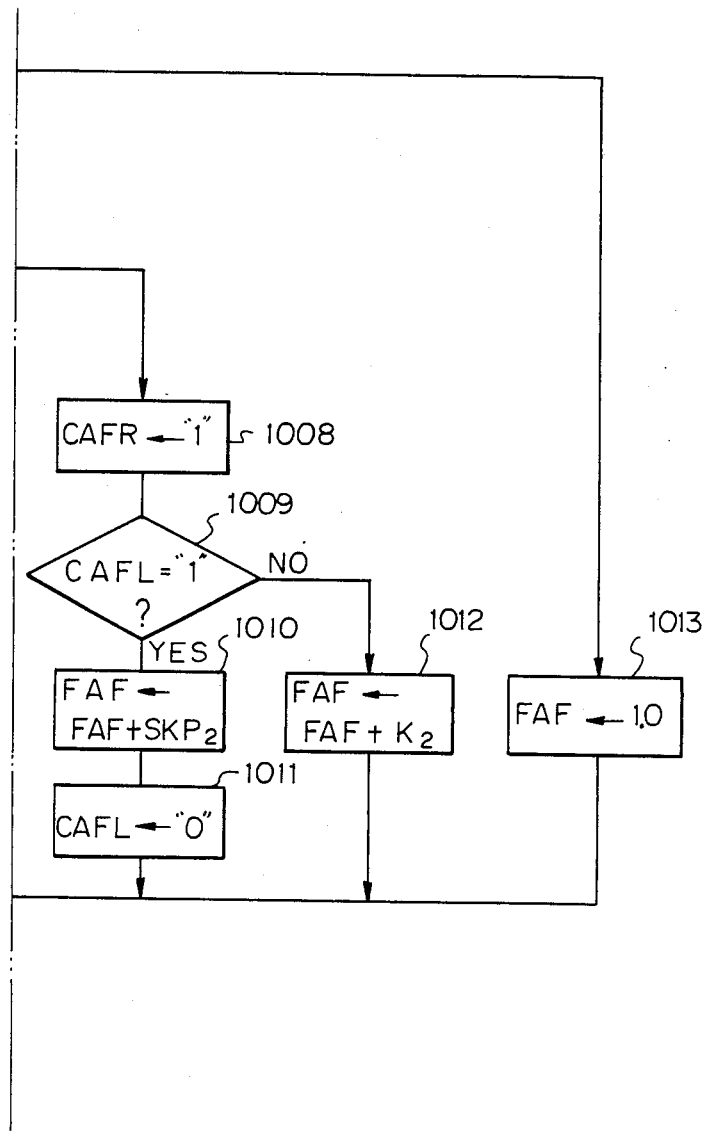

The air-fuel ratio feedback correction coefficient FAF obtained at steps 1005, 1007, 1010, 1012, or 1013 is stored in the RAM 108, and the routine of FIG. 10 is completed by step 1015.

Figure 11:
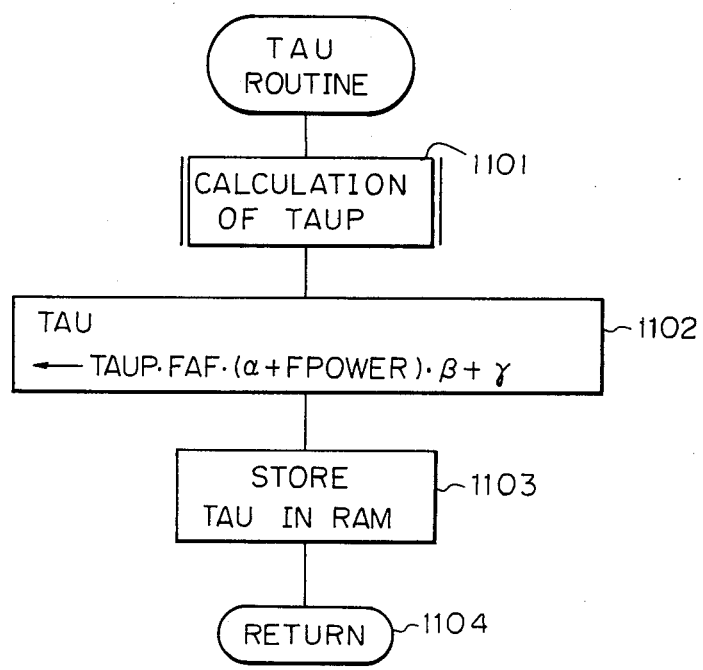

FIG. 11 is a routine for calculating a fuel injection time period TAU executed at every predetermined crank angle. For example, this routine is executed at every 360° CA in a simultaneous fuel injection system for simultaneously injecting all the injectors and is executed at every 180° CA in a sequential fuel injection system applied to a four-cylinder engine for sequentially injecting the injectors thereof.

At step 1101, a base fuel injection time period TAUP is calculated from a two-dimensional map stored in the ROM 107 by using the parameters PM and Ne. Then, at step 1102, a fuel injection time period TAU is calculated by $$TAU \leftarrow TAUP \cdot FAF \cdot (\alpha + FPOWER) \cdot \beta + \gamma$$

where $\alpha$, $\beta$, and $\gamma$ are correction factors determined by other parameters such as the signal of the intake air temperature sensor, the voltage of the battery (both not shown), and the like. At step 1103, the calculated fuel injection time period TAU is stored in the RAM 108, and the routine of FIG. 11 is completed by step 1104.

Figure 13:
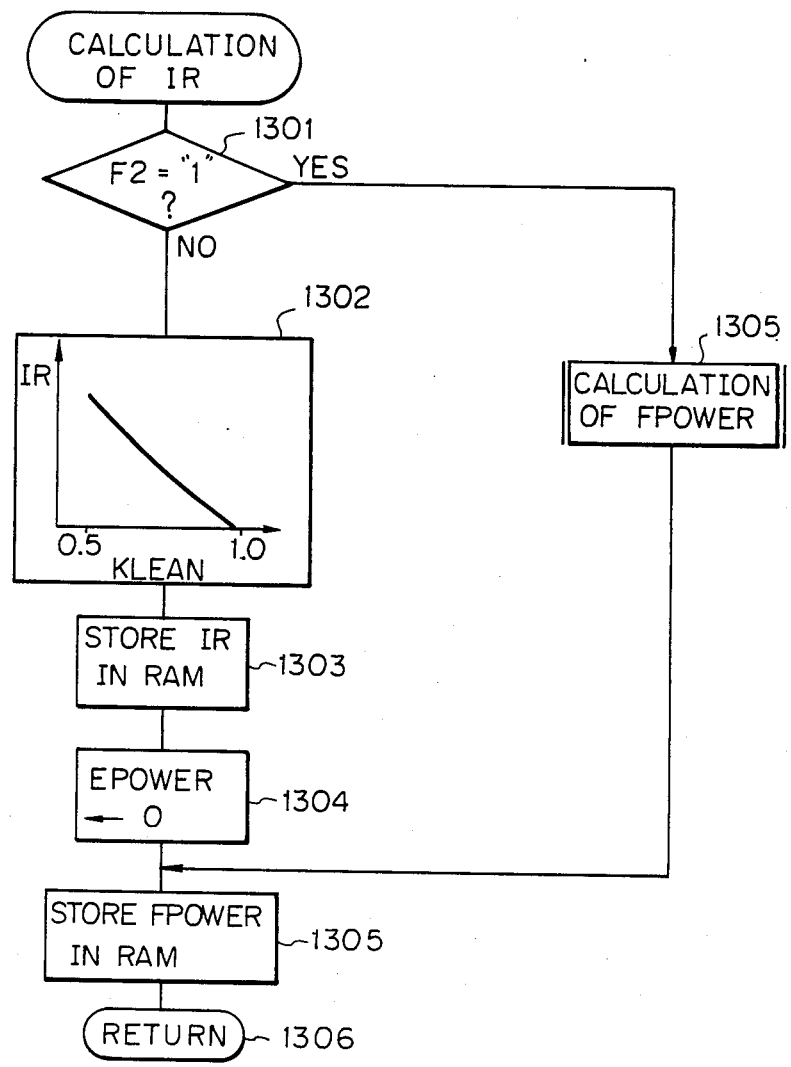
Figure 14:
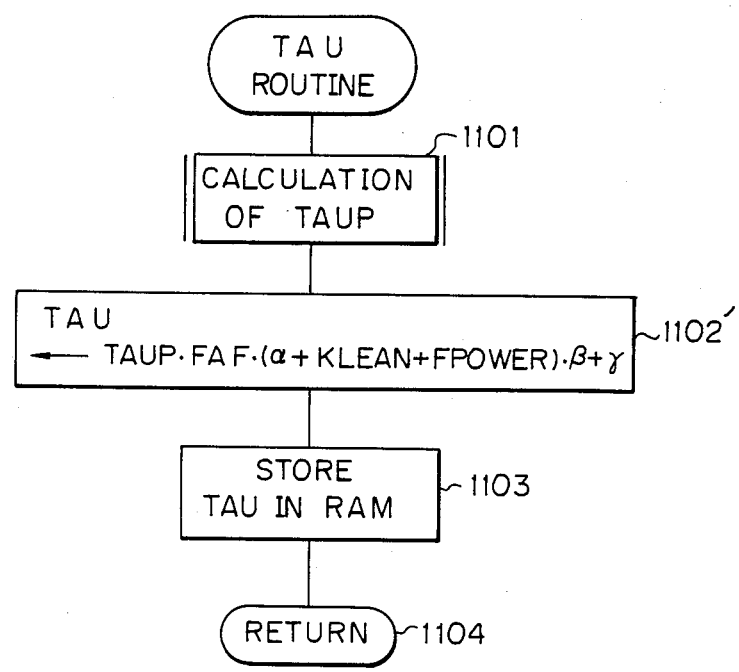

Another example of controlling fuel injection amount will be explained with reference to FIGS. 12, 13, and 14. Note FIGS. 12 and 13 are provided instead of FIG. 9, and FIG. 14 is provided instead of FIG. 11.

Figure 12:
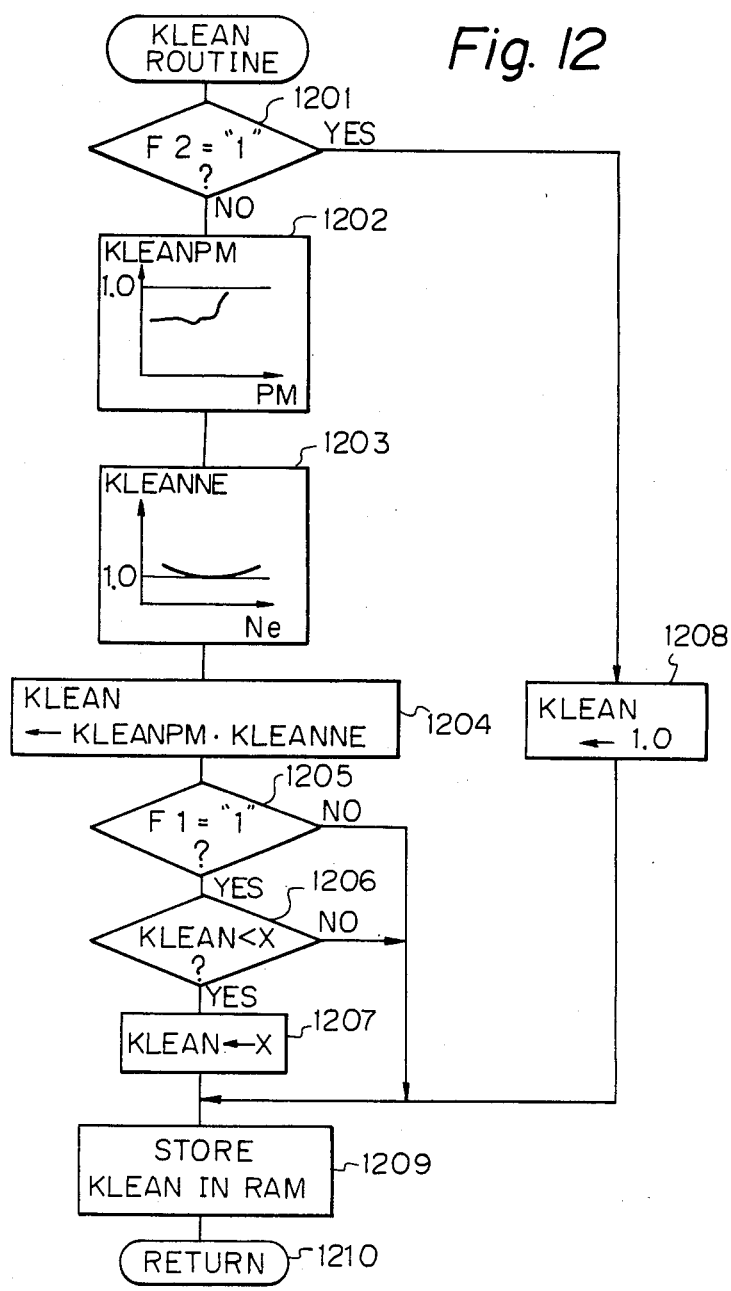

FIG. 12 is a routine for calculating a lean air-fuel ratio correction coefficient KLEAN executed at every predetermined time period. Note that the coefficient KLEAN satisfies the condition: KLEAN≦1.0.

At step 1201, it is determined whether or not the flag F2 is "1". If F2="1", then the control proceeds to step 1208 which causes KLEAN to be 1.0. Contrary to this, if F2="0", the control proceeds to step 1202.

At step 1202, KLEANPM is calculated from a one-dimensional map stored in the ROM 107 by using the parameter PM as shown in the block of step 1202. Also, at step 1203, KLEANNE is calculated from a one-dimensional map stored in the ROM 107 by using the parameter Ne as shown on the block of step 1203. Then at step 1204,

KLEAN←KLEANPM·KLEANNE.

At step 1205, it is determined whether or not the flag F1 is "1". If F1="1", then the control proceeds to steps 1206 and 1207, which guard the value KLEAN by a minimum value X. That is, at step 1206, it is determined whether or not KLEAN<X is satisfied. Only if satisfied, the control proceeds to step 1207, which replaces KLEAN with X. Note that such a minimum value X corresponds to the horizontal line of FIG. 5B.

Then at step 1209, KLEAN is stored in the RAM 108, and this routine of FIG. 12 is completed by step 1210.

FIG. 13 is a routine for calculating a comparison reference value IR executed at every predetermined time period.

At step 1301, it is determined whether or not the flag F2 is "1". If F2="1", the control proceeds to step 1305 which calculates a fuel increment FPOWER from a two-dimensional map using the parameters PM and Ne. If F2="0", then the control proceeds to step 1302 in which a comparison reference value IR is calculated from a one-dimensional map stored in the ROM 107 by using the parameter KLEAN as shown in the block of step 1302, and then at step 1303, IR is stored in the RAM 108. Further, at step 1304, a power fuel increment FPOWER is cleared.

Then, at step 1305, FPOWER obtained at step 1304 or 1305 is stored in the RAM 108. This routine is completed by step 1306.

In FIG. 14, step 1102' is provided instead of step 1102 of FIG. 11. At step 1102', a fuel injection time period TAU is calculated by $$TAU \leftarrow TAUP \cdot FAF \cdot (\alpha + KLEAN + FPOWER) \cdot \beta + \gamma$$

Figure 15:
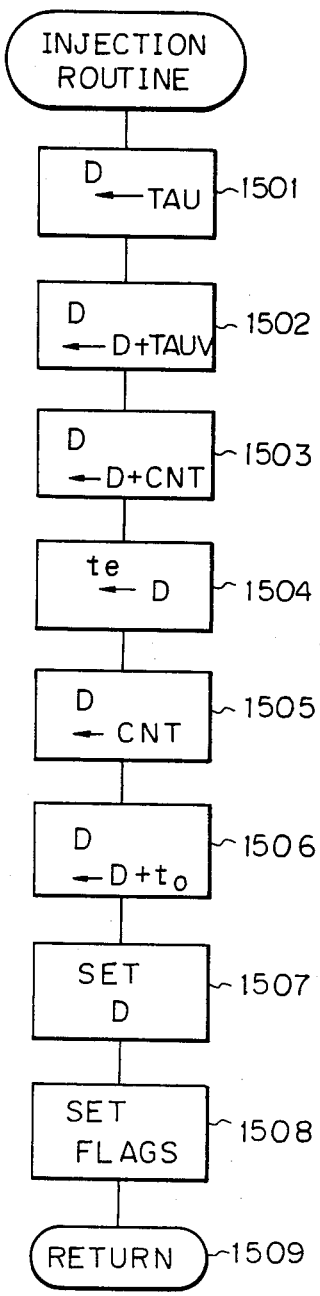

FIG. 15 is a routine for controlling the fuel injection in accordance with the fuel injection time period TAU calculated by the routine of FIG. 11 or 14, executed at every predetermined crank angle. Also, this routine is executed at every 360° CA in a simultaneous fuel injection system and is executed at every 180° CA in an sequential fuel injection system applied to a four-cylinder engine.

At step 1501, the fuel injection time period TAU stored in the RAM 108 is read out and is transmitted to the D register (not shown) included in the CPU 105. At step 1502, an invalid fuel injection time period TAUV which is also stored in the RAM 108 is added to the content of the D register. In addition, at step 1503, the current time CNT of the free-run counter of the timer counter 106 is read out and is added to the content of the D register, thereby obtaining an injection end time $t_e$ in the D register. Therefore, at step 1504, the content of the D register is stored as the injection end time $t_e$ in the RAM 108.

Again at step 1505, the current time CNT of the free-run counter is read out and is set in the D register. Then, at step 1506, a small time period $t_0$, which is definite or determined by the predetermined parameters, is added to the content of the D register. At step 1507, the content of the D register is set in the first compare register of the timer counter 106, and at step 1508, a fuel injection execution flag and a compare I interrupt permission flag are set in the registers of the timer counter 106. The routine of FIG. 15 is completed by step 1509.

Figure 16:
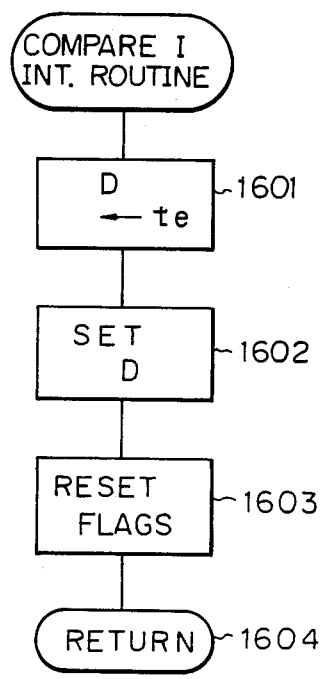

Thus, when the current time CNT of the free-run counter reaches the first compare register, an injection-on signal due to the presence of the fuel injection execution flag is transmitted from the timer counter 106 via the I/O interface 103 to the driver circuit 104, thereby initiating fuel injection by the fuel injector 7. Simultaneously, a compare I interrupt signal due to the presence of the compare I interrupt permission flag is transmitted from the timer counter 106 to the CPU 105, thereby initiating a compare I interrupt routine as illustrated in FIG. 16.

The completion of the fuel injection will be explained with reference to FIG. 16. At step 1601, the injection end time $t_e$ stored in the RAM 108 is read out and is transmitted to the D register. At step 1602, the content of the D register is set in the first compare register of the timer counter 106 and at step 1603, the fuel injection execution flag and the compare I interrupt permission flag are reset. The routine of FIG. 16 is completed by step 1604.

Thus, when the current time CNT of the free-run counter reaches the first compare register, an injection-off signal due to the absence of the fuel injection execution flag is transmitted from the timer counter 106 via the I/O interface 103 to the driver circuit 104, thereby ending the fuel injection by the fuel injector 7. In this case, however, no compare interrupt signal is generated due to the absence of the compare I interrupt permission flag.

Thus, fuel injection of the fuel injector 7 is carried out for the time period TAU.

Figure 17:
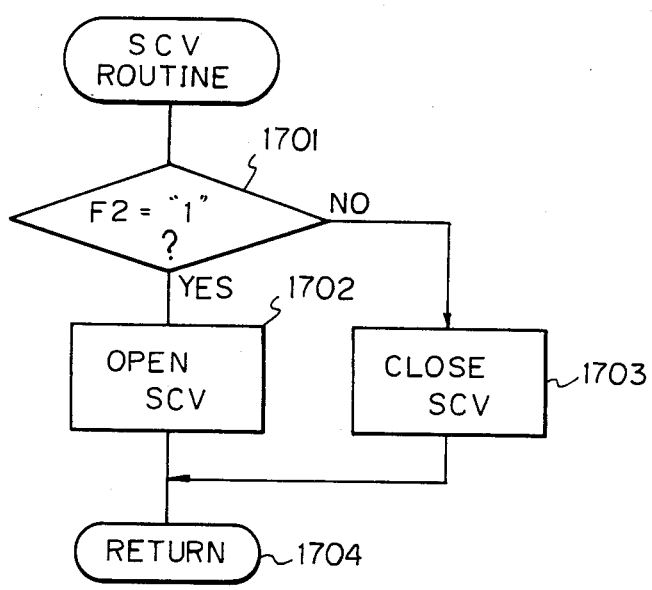

FIG. 17 is an SCV control routine executed at every predetermined time period. As explained above, the control of the SCV 12, i.e., the control of the negative pressure switch valve 12, is carried out by the flag F2 having hysteresis characteristics, not by the output PSW2 of the second switch of the throttle sensor 6. That is, at step 1701, it is determined whether or not F2="1" is satisfied. If F2="1", the control proceeds to step 1702 which opens the SCV 12. If F2="0", then the control proceeds to step 1703, which closes the SCV 12. This routine is completed by step 1704. Thus, the SCV 12 is controlled by the flag F2. Therefore, even when the output PSW2 of the second switch is changed from "1" to "0", control of a lean air-fuel ratio is not carried out before the SCV 12 is closed, since the flag F2 is never caused to be "0" until the intake air pressure PM becomes sufficiently low.

In the above-mentioned internal combustion engine in which combustion is carried out at a lean air-fuel ratio, when a different lean air-fuel ratio in response to the flag F1 is carried out, it is preferable that the ignition timing also be controlled in accordance with the flag F1. Further, when the flag F2 is "1", the SCV 12 is opened to obtain a sufficient intake air amount. In addition, the air-fuel ratio is controlled to be on the rich side with respect to the stoichiometric air-fuel ratio to obtain a good output performance. Therefore, it is necessary to accurately control the ignition timing in view of knocking, thereby obtaining sufficient output performance, since a margin can be set for knocking. In view of this, base ignition timing maps are prepared in accordance with the flags F1 and F2, for changing the ignition timing in accordance with the flags F1 and F2.

Figure 18:
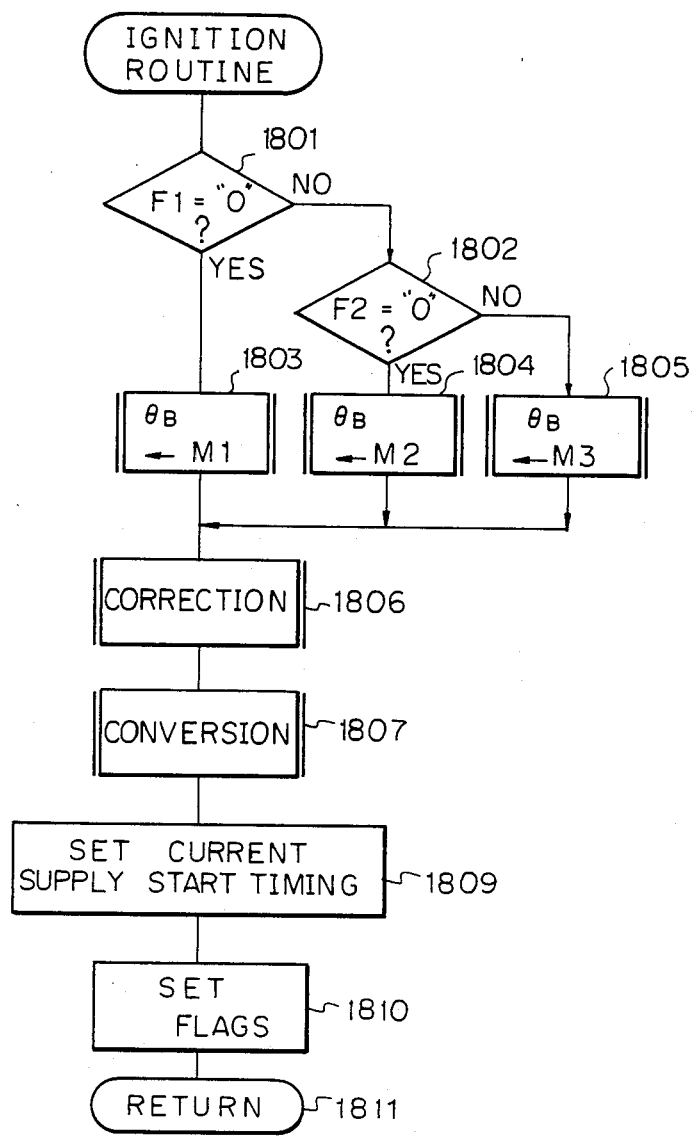

The ignition control according to the present invention will be explained with reference to FIG. 18. The routine of FIG. 18 is executed at every predetermined crank angle, such as 180° CA, in a four-cylinder engine.

At step 1801, it is determined whether or not F1="0" is satisfied. At step 1802, it is determined whether or not F2="0" is satisfied. If F1="0", a base advance angle $\theta_B$ (°CA) is calculated by using the following map M1:

| PM | $N_e$ | | |
|---|---|---|---|
|  | 1000 | 1500 | 2000 (rpm) |
| 600 | 20 | 25 | 30 |
| 500 | 35 | 30 | 35 |
| (mmHg) | | | |

If F1="1" and F2="0", then at step 1804, the base advance value $\theta_B$ (°CA) is calculated by using the following map M2:

| PM | $N_e$ | | |
|---|---|---|---|
|  | 1000 | 1500 | 2000 (rpm) |
| 600 | 15 | 20 | 23 |
| 500 | 15 | 22 | 25 |
| (mmHg) | | | |

If F2="1", then at step 1805, the base advance value $\theta_B$ (°CA) is calculated by using the following map M3:

| PM | $N_e$ | | |
|---|---|---|---|
|  | 1000 | 1500 | 2000 (rpm) |
| 600 | 15 | 20 | 25 |
| 500 | 20 | 25 | 30 |
| (mmHg) | | | |

At step 1806, the base advance value $\theta_B$ is corrected by other parameters to obtain a final ignition timing. At step 1807, the ignition timing is converted into time, (current supply start timing), and a term of 30° CA is converted into time $t_{e'}$, which is then stored in the RAM 108.

At step 1808, the current time CNT of the free-run counter is read out and is set in the D register. The current supply start timing is added to the content of the D register. Then, the content of the D register is set in the second compare register of the timer counter 106.

At step 1809, a current supply execution flag and a compare II interrupt permission flag are set in the registers of the timer counter 106. The routine of FIG. 18 is completed by step 1810.

Figure 19:
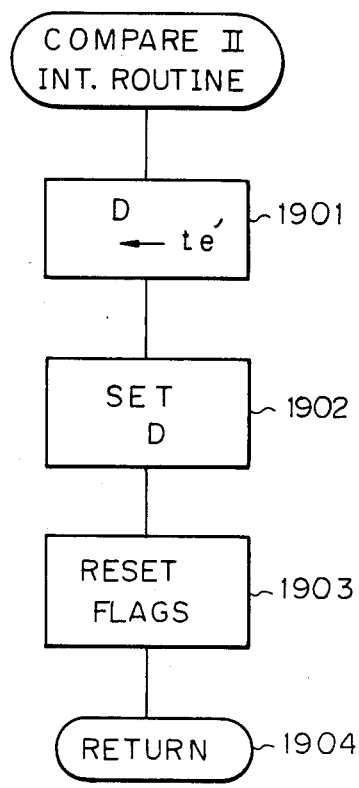

Thus, when the current time CNT of the free-run counter reached the second compare register, a current supply signal due to the presence of the current supply execution flag is transmitted from the timer counter 106 via the I/O interface 103 to the igniter 23 thereby initiating current supply to the igniter 23. Simultaneously, a compare II interrupt signal due to the presence of the compare II interrupt permission flag is transmitted from the timer counter 106 to the CPU 105, thereby initiating a compare II interrupt routine as illustrated in FIG. 19.

The ignition (spark) will be explained with reference to FIG. 19. At step 1901, the current supply end timing $t'_e$ stored in the RAM 108 is read out and is transmitted to the D register. At step 1902, the content of the D register is set in the second compare register of the timer counter 106 and at step 1903, the current supply execution flag and the compare II interrupt permission flag are reset. The routine of FIG. 17 is completed by step 1904.

Thus, when the current time CNT of the free-run counter reaches the second compare register, a current supply end signal due to the absence of the current supply execution flag is transmitted from the timer counter 106 via the I/O interface 103 to the igniter 23, thereby generating a spark from the spark plug 21. In this case, however, no compare interrupt signal is generated due to the absence of the compare II interrupt permission flag.

Thus, the igniter 23 is turned on before 30° CA of the ignition timing, and the igniter 23 is turned off at the ignition timing.

In the above-mentioned embodiment, flags F1 and F2 having hysteresis characteristics are reset in accordance with the intake air pressure PM. However, the flags F1 and F2 can be reset by using other parameters such as the intake air amount Q or the engine speed Ne. Therefore, while the present invention was explained as applied to a fuel injection system using the parameters PM and Ne, the present invention can be also applied to a fuel injection system using parameters such as the intake air amount and the engine speed or the throttle opening value and the engine speed.

As explained above, according to the present invention, since flags (switch means) having hysteresis characteristics using a parameter such as the intake air pressure are introduced into the air-fuel control, hunting due to the mechanical throttle valve switch can be avoided, thus reducing the fluctuation of the air-fuel ratio. In addition, unstable operation of a valve such as an SCV is prevented.

What is claimed is:

1. A method for controlling the air-fuel ratio in an internal combustion engine having a throttle valve therein comprising the steps of:
   determining whether or not the opening of said throttle valve reaches a definite value;
   fetching a parameter of said engine as a first value showing the load thereof, when the opening of said throttle valve reaches said definite value;
   calculating a second value of said parameter of said engine, smaller than said first value;
   determining whether or not said parameter of said engine reaches said second value;
   calculating whether a first state is set by the opening of the throttle valve reaching said definite value and whether a second state is set by said parameter of said engine reaching said second value;
   calculating an air-fuel ratio in response to said first and second states; and
   controlling the air-fuel ratio of said engine so that it is brought close to said calculated air-fuel ratio.

2. A method as set forth in claim 1, further comprising the steps of:
   calculating an ignition timing in response to said flag; and
   performing ignition upon said engine at said ignition timing.

3. A method as set forth in claim 1, further comprising a step of generating a swirl in said engine in response to said flag.

4. A method as set forth in claim 1, wherein said parameter is the intake air pressure of said engine.

5. A method as set forth in claim 1, wherein said parameter is the intake air amount of said engine.

6. A method as set forth in claim 1, wherein said parameter is the speed of said engine.

7. An apparatus for controlling the air-fuel ratio in an internal combustion engine having a throttle valve therein, comprising:
   means for determining whether or not the opening of said throttle valve is smaller than a definite value;
   first switch means which is in an on-state only when the opening of said throttle valve is equal to or larger than said definite value;
   second switch means which is turned on by the turning-on of said first switch means;
   means for fetching a parameter of said engine as a first value showing the load thereof when said first switch means is turned on;
   means for calculating a second value of said parameter of said engine smaller than said first value;
   means for determining whether or not said parameter of said engine is smaller than said second value;
   means for turning off said second switch means, when the opening of said throttle valve is smaller than said second value;
   calculating a target air-fuel ratio in response to said second switch means; and
   means for controlling the air-fuel ratio of said engine so that it is brought close to said target air-fuel ratio.

8. An apparatus as set forth in claim 7, further comprising:
   means for calculating an ignition timing in response to said second switch means, and performing ignition upon said engine at said ignition timing.

9. An apparatus as set forth in claim 7, further comprising:
   swirl control valve means for generating swirl in said engine; and
   means for controlling said swirl control valve means in response to said second switch means 10. An apparatus as set forth in claim 7, wherein said parameter is the intake air pressure of said engine.

11. An apparatus as set forth in claim 7, wherein said parameter is the intake air amount of said engine 12. An apparatus as set forth in claim 7, wherein said parameter is the speed of said engine.

* * * * *